United States Patent [19]
Sisk

[11] 3,783,317
[45] Jan. 1, 1974

[54] DYNAMOELECTRIC MACHINE ROTOR
[75] Inventor: Hollis D. Sisk, Chesterfield, Mo.
[73] Assignee: Wagner Electric Corporation, Newark, N.J.
[22] Filed: Nov. 22, 1972
[21] Appl. No.: 308,707

[52] U.S. Cl. .................. 310/212, 310/262, 310/42
[51] Int. Cl. .......................................... H02k 3/06
[58] Field of Search ............... 310/211, 42, 262, 310/217, 64, 65

[56] References Cited
UNITED STATES PATENTS
3,210,584  10/1965  Jorgensen et al. ............. 310/211 X Primary Examiner—William M. Shoop, Jr.
Assistant Examiner—Mark O. Budd
Attorney—Joseph E. Papin and James R. Bell

[57] ABSTRACT

A squirrel-cage rotor for an electric motor is provided with a lamination stack having the usual integrally cast windings and conductively connected opposed end rings, and cold strength bars are also integrally cast in said lamination stack respectively having opposed ends adjacent to said end rings with at least one of said opposed ends electrically disassociated from its adjacent end ring.

9 Claims, 7 Drawing Figures

DYNAMOELECTRIC MACHINE ROTOR

FIELD OF THE INVENTION

The present invention relates generally to electric motors and in particular to an improved squirrel-cage rotor or armature for use therein.

BACKGROUND OF THE INVENTION

In the past, squirrel-cage rotors for use in electric motors including hermetically sealed or compressor motors were provided with a lamination stack having a plurality of skewed passages extending generally in an axial direction through said lamination stack and adjacent to the periphery thereof. The lamination passages were predeterminately skewed by assembling the laminations so that at least some of the passages thereof were received on skewed pins of a mounting or assembly fixture. A centrally located axially extending bore in which the motor shaft was received was also provided through the rotor lamination stack. By utilizing casting methods and equipment well known in the art, squirrel-cage bars or windings were simultaneously cast in the rotor skewed passages and integrally formed with opposed end or short-circuiting rings cast on the end portions of said lamination stack and adjacent to the periphery thereof, and the metal utilized in the casting process was, of course, non-magnetic electrically conductive material such as, for instance, aluminum. The shaft receiving bore of the rotors lamination stack is relieved at one end thereof, i.e., provided with an axially aligned counterbore portion for guiding purposes when the motor shaft was pressed into said bore, and in some of the past rotors, the counterbore extended an appreciable length into the rotor lamination stack effecting a "cantilever mount" when said motor shaft was pressed into said bore. One of the disadvantageous or undesirable features of such past squirrel-cage rotor constructions was that the peripheral or skewed passages in the lamination stack were rather small in cross-sectional area necessitating complementary small skewing pins on the assembly fixture which were easily bent or misaligned during the assembly of the rotor lamination stack thereon; and, as a result of such skewer pin bending, the cast rotor bars would not predeterminately overlap two adjacent stator slot windings thereby obviating the possibility of starting the motor or at least deleteriously affecting the starting characteristics thereof. Another disadvantageous or undersirable feature of such past squirrel-cage rotor constructions was that the cast squirrel-cage bar or winding lost strength due to the $I^2R$ heat generated by the current flowing therethrough, and as a result of such strength loss, the laminations in which the aforementioned counter bore is provided have a tendency to shift or slip toward the motor shaft which extends coaxially through said counterbore thereby destroying the air gap provided between the rotor and its cooperating stator. And still another disadvantageous or undesirable feature of such past squirrel-cage rotor constructions was that when they were mounted on the end of a shaft, such as for instance the shaft of a motor driven hermetic type compressor, the stiffness or strength of said rotors in the axial direction thereof was not great enough to offer supplementary support for said shaft or to compensate for undesired structural weakness, such as the deflection or bending, of said shaft under load.

The principle object of the present invention is to provide a squirrel-cage rotor for use in an electric motor which overcomes the aforementioned disadvantageous and undesirable features, as well as others, and this, as well as other objects and advantageous features of the present invention, will become apparent from the specification which follows.

SUMMARY OF THE INVENTION

Briefly, the present invention includes a rotor for an induction type motor having a stack of laminations with a bore therethrough, a squirrel-cage winding of non-magnetic electrical conductive material integrally cast in said stack, slot means in said stack extending generally axially therethrough, and support means cast in said slot means and electrically disassociated from said squirrel-cage winding.

BRIEF DESCRIPTION OF THE DRAWINGS

In the drawings which illustrate an embodiment of the present invention and wherein like numerals refer to like parts wherever they occur.

DETAILED DESCRIPTION OF THE INVENTION

Figure 1:
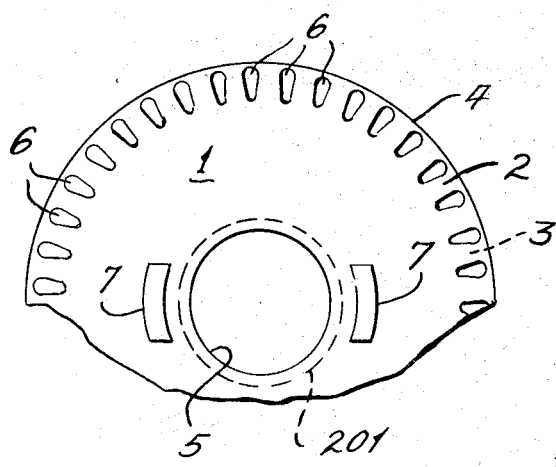
FIG. 1 is a partial plane view of a lamination utilized in the rotor embodying the present invention.

Referring now to the drawings in detail and in particular to FIG. 1, an annular rotor lamination 1 which is stamped from magnetizable iron or steel sheet or strip material is provided with opposed sides or faces 2, 3 interconnected by a peripheral or circumferential edge portion 4, and a centrally located axially extending bore or hole 5 adapted to receive a rotatable motor shaft (not shown) is provided through said lamination between said opposed faces. A plurality of angularly spaced conductor slots, openings or passages 6 are axially provided through the lamination 1 between the faces 2, 3 and adjacent to the peripheral edge 4, and diametrally opposed support slots, openings or passages 7 are also axially interconnected between said lamination faces being predeterminately radially spaced between the bore 5 and peripheral conductor slots 6; however, while only two diametrally opposed support slots 7 are shown, it is, of course, contemplated that any desired number of such support slots may be utilized. Although not shown in the drawings, it is also contemplated that venting slots may be provided through the lamination 1, as well known in the art.

Figure 2:
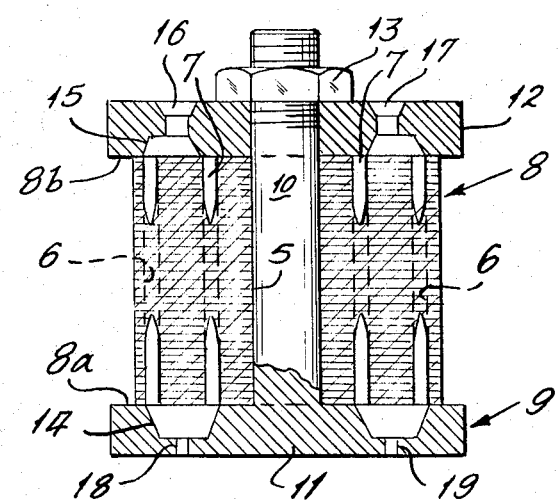
FIG. 2 is a schematic view of the rotor embodying the present invention assembled with a casting die.

In order to achieve a skew of the lamination conductor and support slots 6, 7 and the proper alignment of the bore 5 therein, a plurality of the laminations 1 may be loosely arranged in axial alignment with the faces 2, 3 superposed on each other to form a stack 8 with opposed ends 8a, 8b defining a predetermined height, said stack, of course, being assembled with the lamination support slots 7 received on the skewer pins of an assembly fixture (not shown), as is well known in the art. The axially aligned and skewed lamination stack 8 is them compressed into rather tight interface relation on a casting die or fixture 9, such as that shown in FIG. 2 for instance, wherein the bore 5 of said lamination stack is received on a central arbor 10 of a lower plate 11 which is engaged with the opposed end 8a of said lamination stack, and an upper plate 12 is pressed toward compressive engagement with the opposed end 8b of said lamination stack by a nut 13 or the like threadedly received on the upper or free end of said arbor. Annular end ring cavities 14, 15 generally U-shaped in configuration are respectively provided in the plates 11, 12 adjacent to the opposed ends 8a, 8b of the lamination stack 8, and the cavity 14 communicates with both the axially aligned and skewed conductor and support slots 6, 7 of said lamination stack while the cavity 15 communicates only with the conductor slots 6. Spue holes 16, 17 are provided in the plate 12 through which a molten non-magnetic, electrical conducting metal, such as aluminum, is introduced flowing through the cavity 15, the conductor slots 6, the cavity 14 and the support slots 7, and vent passages, such as those shown at 18, 19, are provided in the lower plate 11 communicating with the cavity 14 for the exhaustion of trapped gases during the casting operation, said vent passages being sufficiently small to substantially obviate the escape of the molten metal.

Figure 3:
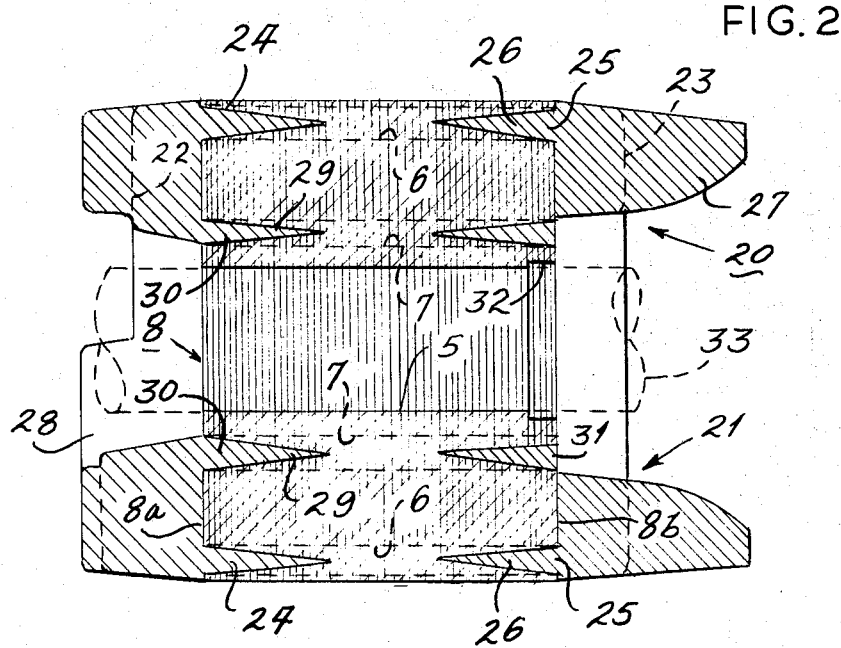
FIG. 3 is a sectional view showing the cast rotor embodying the present invention in cross-section.
Figure 4:
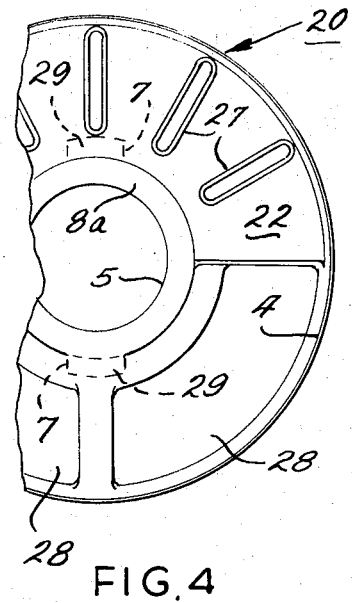
FIG. 4 is a partial left end view of the cast rotor of FIG. 3.
Figure 5:
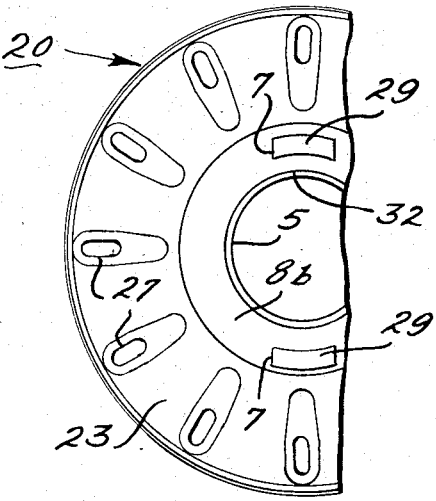
FIG. 5 is a partial right end view of the cast rotor of FIG. 3.

Upon the subsequent cooling and hardening of the cast aluminum, a cast rotor or armature, indicated generally at 20 in FIG. 3, is provided with an integral squirrel-cage winding 21 defined by end or short circuiting rings 22, 23 integrally cast on or connected with the opposed ends 8a, 8b of the lamination stack 8 and interconnecting with each of the opposed ends 24, 25 of the integrally cast conductor bars or windings 26 respectively formed in the conductor slots 6. As well known in the art, it is apparent that blower blades and counterbalanced weights 27, 28 may be integrally cast on the end rings 22, 23, if desired. In addition to the squirrel-cage winding 21, it should be noted that integrally cast strength or support bars 29 are formed in the support slots 7 respectively having opposed end portions 30, 31, and the opposed end portions 30 are connected or integrally formed with the end ring 22 while the opposed end portions 31 are respectively predeterminately spaced from the end ring 23 being mechanically and electrically disassociated therefrom.

Subsequent to the above-discussed casting operation for the cast rotor 20, one of the opposed ends of the rotor bore 5 is counterbored, as shown at 32, to provide a recess or lead-in guide through which a motor or compressor shaft 33 is inserted or assembled into press-fitted engagement with said rotor bore, as is well known in the art, but it should be noted that the laminations 1 of the rotor stack 8 in which said counterbore is defined are predeterminately radially spaced from the periphery of said shaft.

When the cast rotor 20 is assembled for operation, such as with a stator of a motor or compressor unit for instance (not shown), energization of such stator induces current to flow in the squirrel-cage winding 21 of said cast rotor effecting rotation thereof to drive the shaft 33, and during such periods of energization, the $I^2R$ heat generated by the current flowing through said squirrel-cage winding causes a weakening or loss of strength in the cast conductor bars 26 thereof since the cast aluminum forming said conductor bars has a tendency to soften in response to the aforementioned $I^2R$ heat. However, since the end portions 31 of the support bars 29 in the slots 7 of the cast rotor 20 are electrically disassociated from the end ring 23 of the squirrel-cage winding, said support bars do not carry current and are free of the aforementioned generated $I^2R$ heat thereby obviating any weakening or loss of strength due to softening of the cast aluminum forming said support bars. In other words, the support bars 29 are, in effect, cold bars affording cold strength or support to the laminations 1 of the stack 8 in order to maintain such laminations in their as-cast positions and obviate radial movement or shifting of such laminations relative to the shaft 33 in the area of the rotor counterbore 32 which would, in effect, destroy the air gap between the cast rotor 20 and its associated stator thereby impairing or destroying the desired operational characteristics thereof. Since the bore 5 of the cast rotor 20 is in press-fitted engagement with the shaft 33, such press-fitted engagement, of course, obviates shifting or radial movement of the laminations 1 defining said rotor bore relative to said shaft; however, it should be noted that the cold strength of the cast support bars 29 imparts additional strength, stiffness or rigidity in the axial direction to said shaft in the area of the press-fitted engagement thereof with said rotor bore. This additional axial rigidity afforded to the shaft 33 by the cold strength of the support bars not only serves to enhance or "beef up" the design characteristics of said shaft but also serves to improve the operational characteristics thereof by compensating for the tendency of said shaft to deflect or bend under load, i.e., to reduce or eliminate shaft wobble or eccentric rotation under load.

Figure 6:
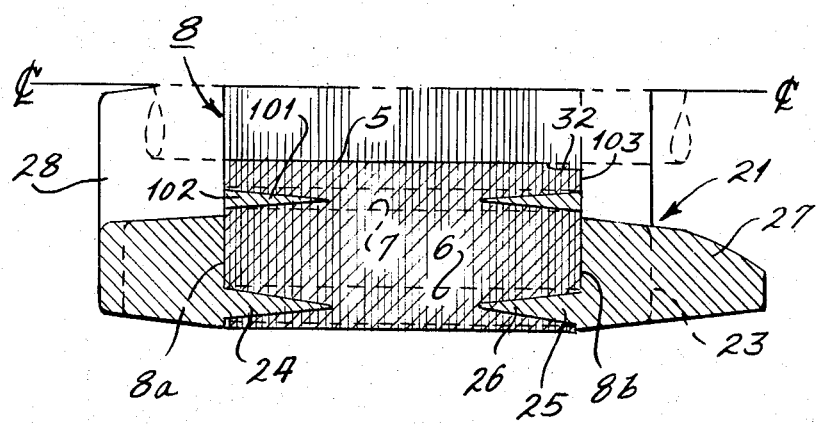
FIG. 6 is a partial sectional view showing an alternative construction for the cast rotor of FIG. 3 also embodied in the present invention in cross-section.

Referring now to FIG. 6, another cast rotor 100 is shown having substantially the same component parts, operating in substantially the same manner and formed by a casting operating in substantially the same manner as the previously described cast rotor 20 with the following exceptions.

The cast rotor 100 is provided with support bars 101 integrally cast in the support slots 7 of the lamination stack 8, and the opposed end portions 102, 103 of said support bars are each predeterminately mechanically spaced and electrically disassociated from the opposed end rings 22, 23 of the squirrel-cage winding 21 respectively adjacent to said support bar end portions.

Figure 7:
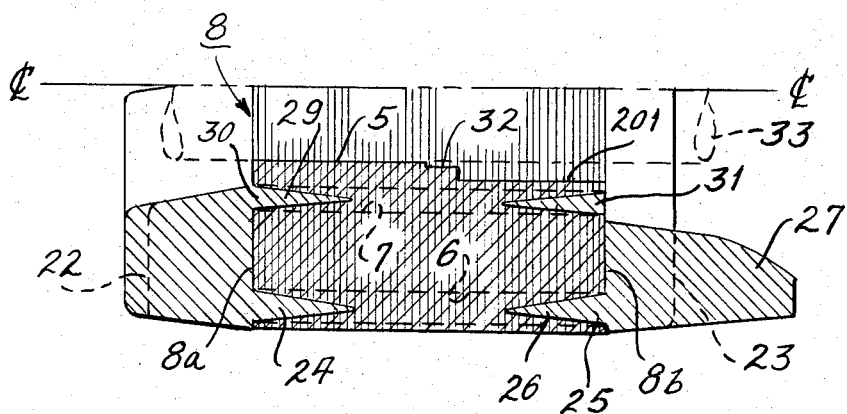
FIG. 7 is a partial sectional view showing another alternative construction for the cast rotor of FIG. 3 also embodied in the present invention in cross-section.

Referring now to FIG. 7, another cast rotor 200 is shown having substantially the same component parts, operating in substantially the same manner and formed by a casting operation in substantially the same manner as the previously described cast rotors 20, 100.

The cast rotor 200 is provided with another counterbore 201 in axial alignment with the rotor bore 5 and counterbore 32 at the end 8b of the lamination stack 8, and said counterbore 201 is formed by providing a central opening or bore in the laminations 1 greater in diameter than the bore 5, such as shown for convenience by the dotted line 201 in the lamination of FIG. 1. The cast rotor 200 is "cantilever" mounted on the shaft 33 which is press-fitted in engagement with the rotor bore 5, as previously mentioned. As shown, the end portions 31 of the support bars 29 are predeterminately mechanically and electrically disassociated from end ring 23 of the squirrel-cage winding 20 adjacent thereto, however, it is contemplated that the other end portions 30 of said support bars could also be predeterminately mechanically and electrically disassociated from the end ring 22 of said squirrel-cage winding adjacent thereto, as previously described hereinbefore with respect to the cast rotor 100.

From the foregoing, it is now apparent that novel rotors or armatures 20, 100, 200 for electric motors or motor-compressor units meeting the objects and advantageous features set forth hereinbefore, as well as others, are disclosed and that changes as to the precise configurations, shapes and details of the constructions set forth in the disclosure by way of illustration of the preferred embodiments of the invention may be made by those skilled in the art without departing from the spirit of the invention.

The embodiments of the invention in which an exclusive property or privilege is claimed are defined as follows:

1. A rotor for use in an induction type electrical motor comprising:
   a stack of laminations having a bore extending axially therethrough for receiving a rotatable motor shaft; opposed ends on said stack;
   a squirrel cage winding of non-magnetic electrically conducting material integrally cast in said stack adjacent to the periphery thereof;
   a short circuiting end ring formed with said winding and integrally cast on each of the opposed stack ends;
   support slot means in said stack radially disposed between the periphery thereof and said bore and extending through said stack generally axially thereof; and
   support means for said stack cast in said support slot means during the casting operation for said winding,
   said support means integrally cast with one of said end rings and extending through the stack and terminating adjacent the opposite end ring in spaced relationship therefrom so as to be electrically disassociated from the opposite end ring of said winding.

2. A rotor for use in an induction type electric motor comprising:
   a stack of laminations having a central bore extending axially therethrough for receiving a motor shaft;
   a plurality of conductor slot means disposed in said stack radially of said bore and extending generally axially through said stack;
   opposed ends on said stack;
   a squirrel cage winding of non-magnetic electrically conducting material integrally cast with said stack including conductor bars in said conductor slot means;
   a pair of opposed end rings formed with said winding and integrally cast on the ends of said stack and interconnected with said conductor bars, respectively;
   support slot means radially disposed in said stack between said conductor slot means and bore and extending generally axially through said stack; and
   supporting bars of non-magnetic electrically conducting material cast in said support slot means, said support bars integrally cast with one of said end rings and extending continuously through the stack and terminating adjacent the opposite end ring in spaced relationship therewith so as to be electrically disassociated from said opposite end ring of the squirrel cage winding.

3. A rotor according to claim 2, wherein said conductor and support slot means are predeterminately skewed.

4. A rotor according to claim 2, comprising at least one counterbore in said stack axially aligned with said bore, said supporting bars maintaining the lamination of said stack in which said counterbore is defined against radial displacement relative to said shaft.

5. A rotor according to claim 2, comprising a plurality of blower blades integrally cast on at least one of said end rings.

6. A rotor according to claim 2, comprising counterbalance weight means integrally cast on at least one of said end rings.

7. A rotor according to claim 2, wherein said first named slot means are respectively adjacent to the periphery of said lamination stack.

8. A rotor for use in an induction type electric motor comprising:
   a stack of laminations having a bore extending axially therethrough for receiving a rotatable motor shaft; opposed ends on said stack;
   a squirrel cage winding of non-magnetic electrically conducting material integrally cast in said stack adjacent to the periphery thereof;
   a short circuiting end ring formed with said winding and integrally cast on each of the opposed stack ends;
   support slot means in said stack radially disposed between the periphery thereof and said bore and extending through said stack generally axially thereof; and
   support means for said stack cast in said supporting slot means during the casting operation for said winding,
   said support means extending continuously through the stack and terminating adjacent the opposed end rings in spaced relationship therewith so as to be electrically disassociated from the end rings of the winding.

9. A rotor for use in an induction type electric motor comprising:
   a stack of laminations having a central bore extending axially therethrough for receiving a motor shaft;
   a plurality of conductor slot means disposed in said stack radially of said bore and extending generally axially through said stack;
   opposed ends on said stack;
   a squirrel cage winding of non-magnetic electrically conducting material integrally cast with said stack including conductor bars in said conductor slot means;
   a pair of opposed end rings formed with said winding and integrally cast on the ends of said stack and interconnected with said conductor bars, respectively;
   support slot means radially disposed in said stack between said conductor slot means and bore and extending generally axially through said stack; and supporting bars of non-magnetic electrically conducting material cast in said support slot means, said support bars extending continuously through the stack and terminating adjacent the opposed end rings in spaced relationship therewith so as to be electrically disassociated from said end rings of the squirrel cage winding.

* * * * *